United States Patent [19]
Abdesselem et al.

[11] Patent Number: 5,715,246
[45] Date of Patent: Feb. 3, 1998

[54] DYNAMIC PROCESSING TIME DISTRIBUTION SYSTEM FOR USE IN A TIME-DIVISION MULTIPLE ACCESS STATION

[75] Inventors: Ouélid Abdesselem, Paris; Christian Massy, Sevres; François Gerard, Paris, all of France

[73] Assignee: Alcatel Mobile Phones, Paris, France

[21] Appl. No.: 582,959

[22] Filed: Jan. 4, 1996

[30] Foreign Application Priority Data

Jan. 5, 1995 [FR] France .................. 95 00067

[51] Int. Cl.$^6$ .................................................. H04B 7/212
[52] U.S. Cl. .................................. 370/347; 370/468
[58] Field of Search ........................... 395/287, 297; 370/347, 442, 443, 468

[56] References Cited

U.S. PATENT DOCUMENTS

| | | | |
|---|---|---|---|
| 5,515,379 | 5/1996 | Crisler et al. | 370/348 |
| 5,561,791 | 10/1996 | Mendelson et al. | 370/468 |
| 5,583,869 | 12/1996 | Grube et al. | 370/347 |
| 5,594,727 | 1/1997 | Kolbenson et al. | 370/468 |

*Primary Examiner*—Benedict V. Safourek
*Attorney, Agent, or Firm*—Sughrue, Mion, Zinn, Macpeak & Seas, PLLC

[57] ABSTRACT

The invention provides a system for dynamic distribution of processing time during a frame in a station operating in time-division multiple access mode. The system comprises a set of N independent configurable processing resources respectively associated with N time windows in the frame, where N is a predetermined integer greater than 1. The N configurable processing resources can be configured to yield N respective configured processing resources each of which is activated for a respective particular processing operation for which it has been configured. Each of the N previously configured configurable processing resources is activated so that the respective particular processing operations are effected during the frame.

10 Claims, 2 Drawing Sheets

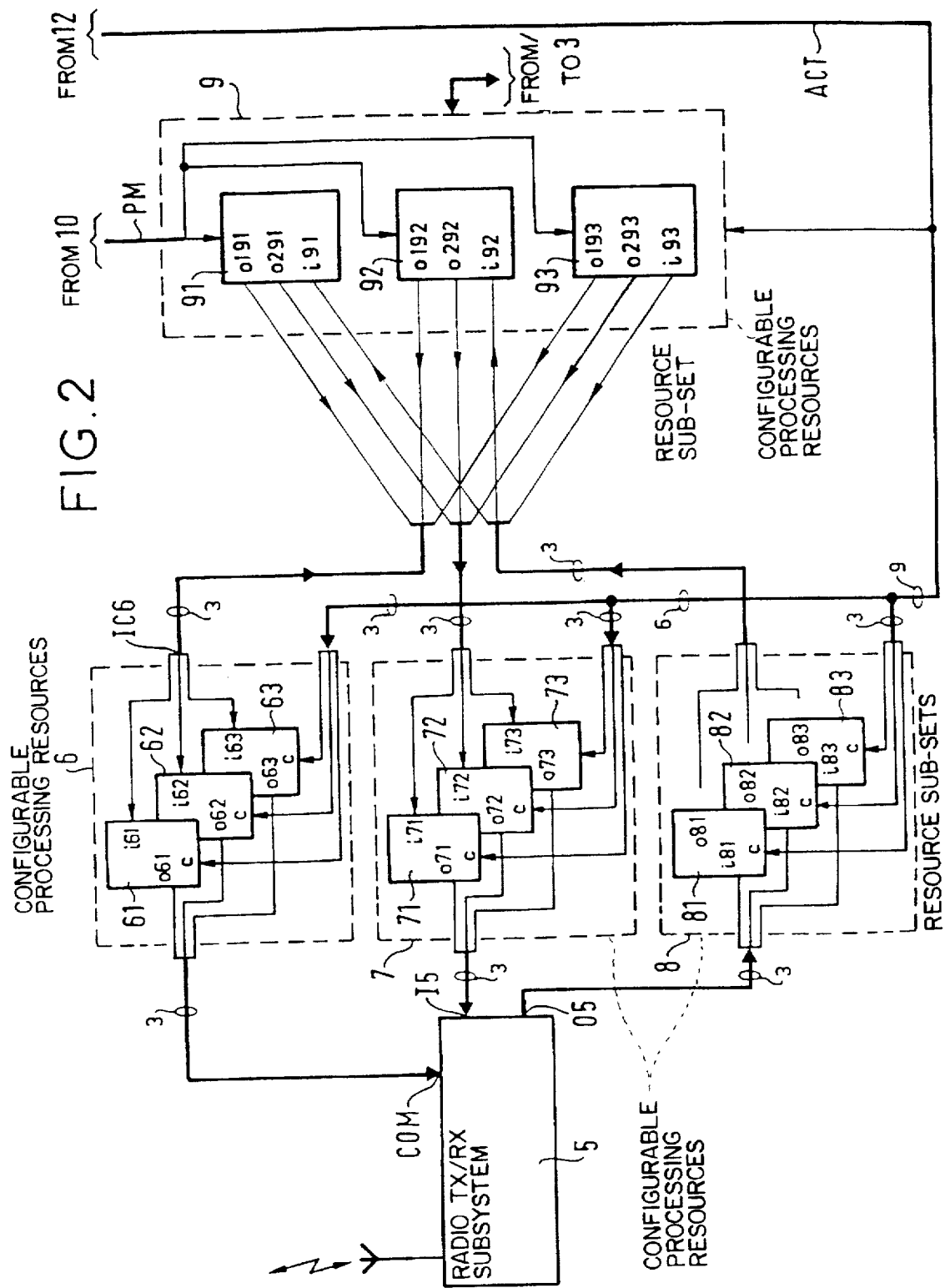

DYNAMIC PROCESSING TIME DISTRIBUTION SYSTEM FOR USE IN A TIME-DIVISION MULTIPLE ACCESS STATION

BACKGROUND OF THE INVENTION

1. Field of the Invention

The present invention concerns a dynamic processing time distribution system for use in a time-division multiple access station. The invention applies in particular to a mobile station, or radiotelephone, in a mobile radio network such as the GSM (Global System for Mobile Communication) network or the DCS-1800 (Digital Communication System at 1 800 MHz) network.

2. Description of the Prior Art

In time-division multiple access systems data is transmitted and received in the form of repetitive patterns called frames. A frame is defined by a predetermined fixed duration T, typically equal to 4.615 ms in the GSM network. It is divided into M time slots so that a base station of the network can handle M calls with M respective mobile stations on the same carrier. A mobile station may carry out different processing operations during a frame, for example radio transmission and reception in two respective windows. In the context of a GSM type cellular mobile radio network, as described in "Systèmes de radiocommunications avec des mobiles" ("Mobile radio systems") by J. G. REMY et al, published by EYROLLES in its CNET-ENST collection, 1992, pages 598–599, at least three sorts of processing operations can be carried out during the same frame period: opening of a radio receive window to receive data, opening of a radio transmit window to transmit data, and opening of a base station monitoring radio receive window. These processing operations, respectively referred to as Rx window opening, Tx window opening and Mx window opening, further result from the control of a radio transmit/receive subsystem.

In a mobile station of a prior art mobile radio network, the sequencing of the window opening operations is typically predetermined for each given phase of operation of the mobile station. For example, one phase might be a call request basic phase on the up link (RACH phase), a cell selection level measurement phase (PLMN phase), a received call monitoring phase (PCH phase), or a complex phase which is the result of combining or superposing a plurality of basic phases, such as a data reception phase, a data transmission phase and a base station monitoring phase, when a call is set up. In the design of the prior art mobile station provision is made for all possible basic and complex phases characterizing the operational status of the mobile station, and for associating with each such phase the appropriate specific predetermined combination of processing operations. Each given basic or complex phase is thus associated with a particular combination of window opening processing operations. For a given complex phase the appropriate particular predetermined combination of window opening operations is determined and the window opening operations of the combination are activated in turn throughout the phase. Thus only the functional aspect of the mobile station defined by its operating phases is retained, independent of the intrinsic mutual independence of the time resources or windows. For each new operating phase of the station, additional software has to be developed, which increases the complexity of the mobile station. In practise the number of phases is limited by the various possible operating states of the station.

A prior art implementation of this kind is seen to be less than optimal when new particular mobile station operating constraints arise that are in opposition to the fixed character of the operating phases envisaged for that station. For example, evolution from the GSM network with its spectrum of 174 frequencies to a DCS-1800 network with a spectrum of 374 frequencies has revealed the limitations of the prior art, for example for a mode of operation to "connect" a mobile station to a cellular mobile radio network, for example as the result of switching on the mobile station or the user searching for a particular operator network or PLMN. This procedure starts by a search for the control frequencies transmitted by the base stations nearest the mobile station, based on the measured level at which each frequency of the spectrum is received by the mobile station. For each measured level, a frequency synthesizer in the radio transmit/receive subsystem is set to a respective frequency in the spectrum and an Mx window is opened for the acquisition of samples. The samples acquired for each frequency from the spectrum are processed to measure them, possibly after processing to average them over a plurality of successive windows opened for the same frequency. Because of the large number of Mx windows to be opened in the DCS-1800 system, given that there are 374 frequencies in the spectrum, this search for the control frequencies transmitted by the base stations nearest the mobile station can take a relatively long time. The DCS-1800 recommendations specify that the duration of the procedure searching for a particular operator network must not exceed five seconds. Although limited, this duration is nevertheless relatively long and another operating phase of the mobile station, such as the received call listening phase, cannot be activated and overlap the search phase before it expires. Based on a functional approach to the mobile station, the prior art cannot solve the problem of the imposed duration of the search procedure except by increasing the complexity of the mobile station by adding a phase dedicated to the opening of more than one (typically three) Mx windows in the same frame period T. A received call listening process cannot be executed during this phase unless a complex phase is provided that is the result of superposing a processing operation to open two Mx windows per frame and a processing operation to open a received call listening window.

The functional approach to mobile station design used in the prior art leads to the necessity of predefining complex phases each associated with an appropriate and fixed combination of window opening operations, activated in turn for a particular mode of operation of the station. This functional approach is seen to be less than optimal if optimization or evolution of the mobile station should prove necessary.

The invention is directed to remedying the above drawback by providing a dynamic processing time distribution system that does not rely on predefined complex phases but instead uses dynamic superposition of basic phases such as window opening phases.

SUMMARY OF THE INVENTION

To this end, the invention consists in a system for dynamic distribution of processing time during a frame in a station operating in time-division multiple access mode, comprising:

a set of N independent configurable processing resources respectively associated with N time windows in said frame, where N is a predetermined integer greater than 1, means for configuring said N configurable processing resources to yield N respective configured processing resources each of which can be activated for a respective particular processing operation for which it has been configured, and means for activating each of said N previously configured configurable processing resources so that said respective particular processing operations are effected during said frame.

The station can be a mobile station in a mobile radio network further comprising a radio transmit/receive subsystem.

The set of resources further comprises a sub-set of N sequencing units each of which is configurable by at least one message which depends on a basic operating phase of said mobile station, each of said units being activated to sequence application functions relating to said basic phase for which said unit has been configured.

The system then comprises a common application unit comprising a plurality of application functions that can be invoked by each of said sequencing units.

The set advantageously further comprises a sub-set of N buffer memories each of which is configurable by storing specific command words of said radio transmit/receive subsystem transmitted by a respective one of said sequencing units and each of which can be activated for a processing operation to program said transmit/receive subsystem.

The set may further comprise a sub-set of N buffer memories each of which is configurable by storing data samples received from said radio transmit/receive subsystem in response to a receive time window and each of which can be activated for a processing operation to transmit said received data samples to a respective one of said sequencing units.

Equally, the set may further comprise a sub-set of N buffer memories each of which is configurable by storing data samples received from a respective one of said sequencing units and each of which can be activated to transmit said data samples in a transmit time window.

Control means are typically provided for reconfiguring one of said sequencing units before a current phase for which said one sequencing unit has been configured has terminated if a subsequent phase arises having a priority level higher than a priority level of said current phase.

In one embodiment of the invention the N resources of the same sub-set are all invoked in a frame for N respective processing operations to receive data in N monitoring windows.

Other features and advantages of the present invention will emerge more clearly from a reading of the following description given with reference to the corresponding appended drawings.

BRIEF DESCRIPTION OF THE DRAWINGS

FIG. 2 is a more detailed block diagram of part of the FIG. 2 system, in a preferred embodiment of the invention concerning a mobile station in a mobile radio network.

DETAILED DESCRIPTION OF THE PREFERRED EMBODIMENTS

Figure 1:
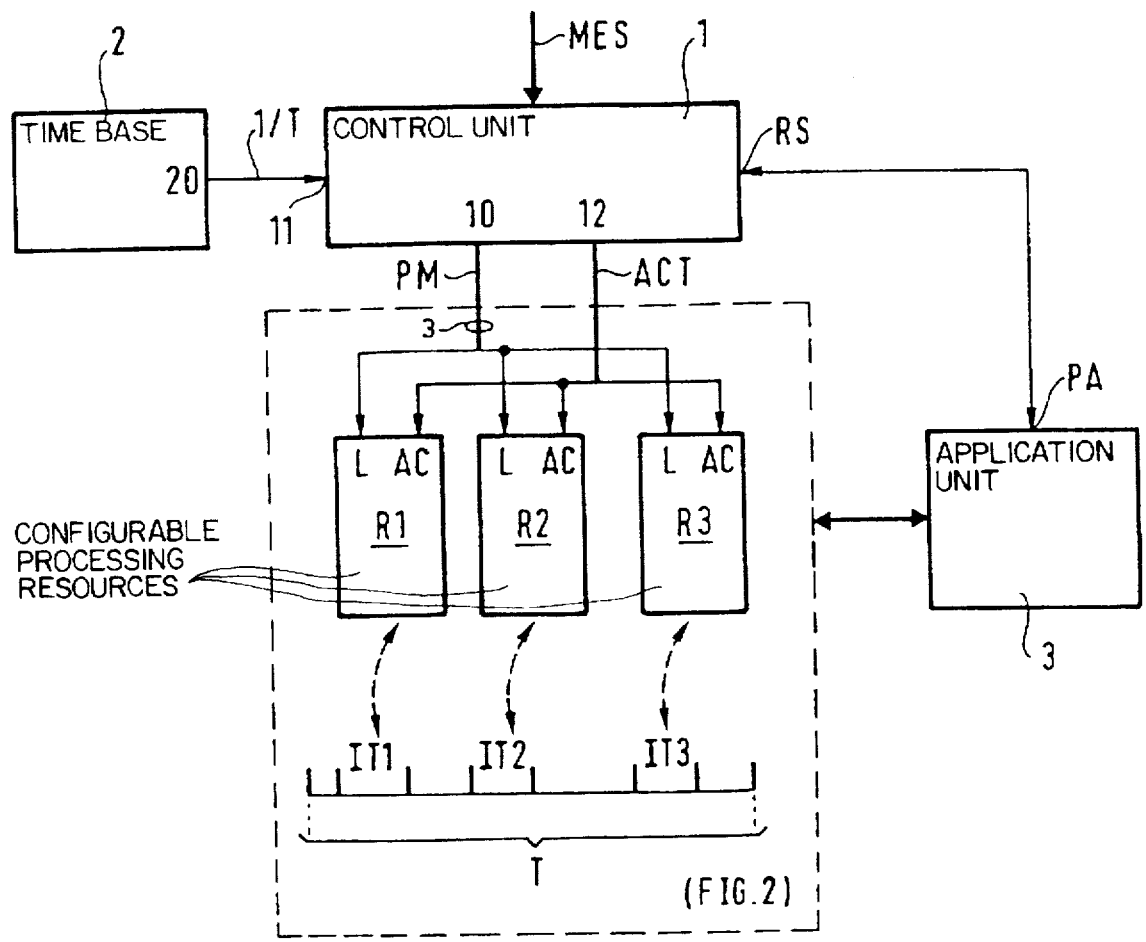
FIG. 1 is a block diagram of a dynamic processing time distribution system in accordance with the invention for use in a time-division multiple access station.

The following description relates to an embodiment concerning a mobile station in a mobile radio network.

Referring to FIG. 1, which is a highly schematic block diagram, a processing time distribution system in accordance with the invention comprises a control unit 1, a timebase 2, an application unit 3 and a set of N=3 configurable processing resources R1, R2 and R3. Although shown as a single set in FIG. 1, in practice there are several different configurable processing resource sub-sets (see description below relating to FIG. 2). N=3 configuration outputs 10 of the control unit 1 are connected to N=3 respective loading inputs L of the configurable processing resources R1, R2 and R3. N=3 activation outputs 12 of the control unit 1 are connected to N=3 respective activation inputs AC of the processing resources R1, R2 and R3. An output 20 of the timebase 2 is connected to an input 11 of the control unit 1. The control unit 1 is connected to the application unit 3. Each of the three resources R1, R2 and R3 utilizes common application functions in the form of hardware and software entities included in the unit 3. The system shown operates in the following manner. In normal operation, the control unit 1 receives messages MES identifying new basic phases of operation of the mobile station, such as a phase to connect the mobile station to a given network, a call request phase executed by the mobile station, etc. In response to receiving a message MES of this kind, the control unit 1 determines the use of the resources R1, R2 and R3, which are independent of each other, for respective given processing operations associated with basic phases, which can be identical to each other, with the aim of optimizing use of all of the operating phases in the mobile station. To this end, the control unit 1 transmits respective configuration messages PM to the resources R1, R2 and R3 via the output 10. At the frame start, on receiving a frame start hardware interrupt, the control unit 1 configures, for the duration of the frame, in accordance with the MES messages that it receives, the N configurable processing resources to provide N respective configured processing resources each of which can be activated to carry out a particular processing operation for which it is configured. This configuration is a result of the unit 1 transmitting to each resource R1, R2 and R3 a respective configuration message PM identifying a particular phase of operation. The control unit can also transmit application unit initialization messages PA to the application unit 3. In the embodiment described here, for example, an initialization message of this kind might comprise a word identifying the mobile radio network concerned (GSM or DCS-1800) the effect of which is to initialize appropriately the application functions in the unit 3 invoked by the resources R1, R2 and R3. In accordance with the invention, a resource is "configurable" if it is not associated in a fixed manner with any particular processing operation, and consequently needs to be configured. A configurable resource of this kind is activated after it is configured in order to carry out the particular processing operation for which it has been configured. In accordance with the frame timing 1/T provided by the timebase 2, the unit 1 produces respective activation signals ACT applied to the activation inputs AC of the resources R1, R2 and R3 to activate each of the N=3 previously configured configurable processing resources so that the particular processing operations are carried out during respective separate time windows in the frame period. Processing results RS, for example receive processing results, are transmitted from the unit 3 to the control unit 1; these are the results of the processing operations carried out by the application functions invoked by the resources R1, R2 and R3. Because each resource R1, R2 and R3 is independent of the others, if each of them is available they can all be used to open Mx monitoring windows in order to shorten the procedure for connecting to a network. The execution of these N=3 particular processing operations, which may be identical to each other, by the respective N=3 configurable processing resources R1, R2 and R3 during respective time windows IT1, IT2 and IT3 that are separate from each other during the frame period T is shown diagrammatically by the dashed-line arrows in FIG. 1. The unit 1 may receive a message MES before the current phase terminates. To perfect the basic operating phase approach of the invention to mobile station design, as opposed to the functional approach of the prior art, each basic phase is assigned a priority level. Consider, by way of example, a basic phase to connect the mobile station to a network for which the N=3 processing resources R1, R2 and R3 are used to open N=3 monitoring windows Mx, and assume that a message MES identifying a received call listening phase that has a priority level higher than the priority level of the connection phase is received by the control unit 1. In this case, one of the N=3 processing resources is reconfigured by the control unit 1 even though the current phase in this processing resource has not terminated in this resource, in favor of a received call listening window opening processing operation, the other (N−1)=2 processing resources continuing to carry out the monitoring window Mx opening processing operation. The resources are therefore totally independent of each other, which is the result, not of a functional approach to mobile station design, but of an approach based on dividing the operation of the station into independent basic phases.

As touched on with reference to FIG. 1, the concept of a "configurable processing resource" might seem somewhat schematic. A concrete implementation relating to a mobile station in a mobile radio network is now described with reference to FIG. 2, this description covering in detail the implementation of a plurality of sub-sets of N configurable resources within each of which each previously configured resource can be activated to carry out a particular processing operation for which it has been configured. This implementation comprises a radio transmit/receive subsystem 5 and four sub-sets 6, 7, 8 and 9 each of N=3 resources. The resources of the three sub-sets 6, 7 and 8 are buffer memories and the resources of the sub-set 9 are sequencing units. The N=3 resources (buffer memories) of the sub-set 6 are denoted 61, 62 and 63, the N=3 resources (buffer memories) of the sub-set 7 are denoted 71, 72 and 73, the N=3 resources (buffer memories) of the sub-set 8 are denoted 81, 82 and 83, and the N=3 resources (sequencing units) of the sub-set 9 are denoted 91, 92 and 93. The buffer memories 61, 62 and 63 store command words of the radio transmit/receive subsystem 5, the buffer memories 71, 72 and 73 store samples of data to be transmitted via the transmit/receive subsystem 5 and the buffer memories 81, 82 and 83 store samples of data received via the transmit/receive subsystem 5. A first output o191, o192 and o193 of each of the N=3 resources 91, 92 and 93 is connected to an input i61, i62 and i63 of a respective one of the N=3 resources 61, 62 and 63. Three respective outputs o61, o62 and o63 of the three resources 61–63 are connected to a command input COM of the radio transmit/receive subsystem 5. A second output o291, o292 and o293 of each of the N=3 resources 91, 92 and 93 is connected to an input i71, i72 and i73 of a respective one of the N=3 resources 71, 72 and 73. Three respective outputs o71, o72 and o73 of the three resources 71, 72 and 73 are connected to a data input I5 of the radio transmit/receive subsystem 5. A data output O5 of the radio transmit/receive subsystem 5 is connected to three respective inputs i81, i82 and i83 of the resources 81, 82 and 83. Three respective outputs o81, o82 and o83 of these resources 81, 82 and 83 are connected to three respective inputs i91, i92 and i93 of the resources 91, 92 and 93. Each resource in the subsets 61–63, 71–73 and 81–83 has a clock input c connected to the activation output 12 of the control unit 1 so that it can be activated selectively by a signal ACT produced by the unit 1. Similarly, the three resources 91, 92 and 93 receive respective activation signals ACT from the unit 1. These are typically interrupts to activate the sequencing units constituting these resources 91, 92 and 93.

The operation of the system will now be described in part in relation to a phase requested by the user to search for a particular operator network (PLMN). Initially, and depending on the basic operating phases to be executed, at the start of the frame T the control unit 1 transmits respective configuration messages PM to all or some of the sequencing units 91, 92 and 93 so that these units are configured so that each carries out a particular processing operation, typically a transmit or receive operation. The signal at the frame frequency 1/T received by the unit 1 defines activation times (defined by clock and interrupt signals) of the resources 61–63, 71–73, 81–83 and 91–93, respectively. When the resources 91–93 have been configured by the control unit 1, when they are activated they carry out processing operations either to invoke application functions stored in the unit 3 or to configure the buffer memory resources 61–63 and 71–73. In practice, if any of the N=3 processing resources 91–93 is configured for a basic phase relating to a transmit processing operation, it is activated at the frame start to load samples of data to be transmitted into the corresponding respective resource 71–73 and to load transmit-receive subsystem command words into the respective corresponding resource 61–63. Accordingly, if a transmit processing operation concerns one of the units 91–93, this unit 91, 92, 93, configures the respective buffer memory resources 61 and 71, 62 and 72, 63 and 73. If any of the resources 91–93 is configured for a basic phase related to a receive processing operation, said resource is activated after reception of data samples in the corresponding resource 81–83. Configuring one of the resources 61–63 entails storing or writing a command word into the buffer memory that this resource constitutes. Configuring one of the resources 71–73 entails the respective corresponding sequencing unit 91–93 writing data samples into the buffer memory that this resource constitutes. Configuring one of the resources 81–83 entails the transmit/receive subsystem 5 writing data samples into the buffer memory that this resource constitutes. A transmit/receive subsystem command word comprises, for example, an indication of the selected transmit or receive frequency, the time of day and the opening time of the window, or power rise, of the subsystem 5, the amplification level, the offset, etc. The data received or to be transmitted is typically traffic data, general information such as PLMN information or signalling data.

When activated, each of the three sequencing units 91–93 configured by the control unit 1 to carry out a processing operation relating to a given basic phase configures the respective one of the three buffer memory resources 61–63 by writing into the latter a command word to open a monitoring window Mx, receive window Rx or transmit window Tx. Specific values for the receive frequency (equal to a given control frequency), time of day and window opening time, or power rise, of the subsystem 5 are thus stored or written into each of said resources 61–63. The control unit 1 activates each of the N=3 resources 61–63 in turn by means of activation signals ACT at the respective clock inputs c of the resources 61–63 so that the specific values, or command words, stored in the buffer memories that these resources constitute are delivered in succession to the command input COM of the transmit/receive subsystem 5. For each resource 61–63 the result is a particular processing operation programming opening of a window in the transmit/receive subsystem 5. The resources 61–63 are activated in turn during the frame period T. In response to windows being opened by the subsystem 5, in accordance with its programming, data samples are received or transmitted in three successive windows during a frame period T. In the case of a basic phase relating to transmit processing, data samples are written at the frame start, for the window in question, by one of the resources 91–93 in a respective one of the buffer memories 71–73. In the case of receive processing, received data samples are written, for the window in question, by the transmit/receive subsystem 5 into a respective one of the buffer memories 81–83.

Those of the N=3 buffer memories 71–73 configured by the storage of data samples to be transmitted can each be activated for a processing operation to transmit data samples to the transmit/receive subsystem 5. A resource is activated by an activation signal ACT produced by the unit 1 which coincides with the opening of a transmit window. The data samples transmitted by each buffer memory resource 71–73 are then transmitted by the transmit/receive subsystem 5 when a transmit window is opened.

Each of the N=3 buffer memories 81–83 that are configured by the storage of received data from the radio transmit/receive subsystem 5 can be activated for a processing operation to transmit data samples received from the subsystem 5 to the corresponding sequencing unit 91–93. One of these resources is activated by an activation signal ACT produced by the unit 1. The data samples received by one of these buffer memory resources 82–83 are then delivered to a respective one of the inputs i91–i93 of the sequencing units 91–93 of the subset 9. Each of the sequencing units 91–93, configured at the frame start by a message dependent on a basic phase of operation of the mobile station, for example an operation to connect the mobile station to a PLMN, can be activated to process data samples received in this way. Each of them is activated by the control unit 1 which produces respective interrupt signals ACT for activating each of these resources 91–93. In practice, the N=3 sequencing units 91–93 are in the form of three independent programs which sequence application functions in the application unit 3 according to the basic phase being executed. Application processing of the data received from one of the buffer memory resources 81–83 by a respective one of the software resources 91–93 is initialized by the resource 91–93 concerned invoking a processing (demodulation, ...) program in the application unit 3. If more than one of the resources 91–93 is carrying out respective processing operations that are interrelated, the respective application processing operations invoked in the application unit 3 by those resources may not be independent of each other.

From the above, it follows that a given basic phase, such as a cell selection phase, can be duplicated if necessary to yield as many identical basic phases as possible in order to increase the efficiency of the station through optimal use of the resources in each sub-set which are independent of each other. Thus the cell selection phase can be reproduced to yield N=3 interdependent cell selection phases. At the application level (application unit 3), the data received to be processed as the result of opening various Mx windows is interdependent. On the other hand, the resources in each sub-set 6, 7, 8 and 9 of N=3 resources are independent, and are used in this sense by the control unit 1.

In the design in accordance with the invention based on basic phases and independent resources, it was deemed appropriate to introduce the concept of the priority level of a basic phase, so that a current basic phase being executed using a resource in a sub-set of resources can be interrupted by a higher priority phase, so that the resource can be released. To this end, in the control unit 1 configuring the N sequencing units 91–93 at the frame start, means are provided for assigning respective priority levels to the various particular basic phases to be implemented in the station. Thus a message PM transmitted by the unit 1 to a sequencing unit 91, 92 or 93 and which identifies a basic phase of operation of the mobile station is that which is associated with a basic phase having the highest priority level. Of all the basic phases awaiting processing by a given sequencing unit 91–93, the control unit 1 selects that which has the highest priority and a sequencing unit is configured by the control unit 1 using an MES message that identifies the highest priority basic phase. A sequencing unit 91–93 sequences the application functions and, each time it is activated, executes application functions in the unit 3. The control unit 1 comprises means for reconfiguring at least one resource 91–93 at the frame start before a basic phase for which said one resource has been configured has been terminated, as soon as a different phase with a higher priority has to be activated as a matter of priority. In the particular case of a received call listening phase invoked for one of the resources of the sub-set 9 while the station is executing a cell selection phase occupying the N=3 resources of each sub-set 6, 7, 8 and 9, the cell selection processing operation continues in (N−1)=2 of the N=3 resources of each sub-set 6, 7, 8 and 9, while the received call listening phase, which is of higher priority, uses the remaining resource in each of the sub-sets, to enable a receive window to be opened. The control unit 1 is the guarantor of this assigning of basic phase processing operations to each sequencing unit 91–93.

Although the above description is limited to a mobile station in a mobile radio network, and primarily to particular operating modes of the latter, the invention can be extended to any station operating in time-division multiple access mode, such as base stations of a mobile radio network, and to any operating mode of that station.

Note that although several sub-sets of resources 6, 7, 8 and 9 have been referred to, the invention is not limited to this situation, but applies to any system operating in time-division multiple access mode in which there is at least one set of N resources, where N corresponds exactly to the maximal number of windows that can be opened during a frame. These resources are characterized by their mutual independence, which is the result of predefined basic operating phases of the system. The system further uses a control unit 1 to assign each basic phase processing operation to a given sequencing unit.

There is claimed:

1. System for dynamic distribution of processing operations during a frame in a station operating in time division multiple access mode, comprising:

a set of N independent configurable processing resources respectively associated with N time windows in said frame, where N is a predetermined integer greater than 1, means for configuring said N configurable processing resources to yield N respective configured processing resources each of which can be activated for a respective particular processing operation for which each of said processing resources has been configured, said respective particular processing operation being executed during one of said N time windows, and means for activating each of said N previously configured configurable processing resources so that said respective particular processing operations are effected during said frame.

2. System according to claim 1 wherein said station is a mobile station in a mobile radio network further comprising a radio transmit/receive subsystem.

3. System according to claim 2 wherein said set further comprises a sub-set of N sequencing units each being configurable by at least one message depending on a basic operating phase of said mobile station.

4. System according to claim 3 further comprising a common application unit comprising a plurality of application functions said sequencing units being activated to sequence said application functions relating to said basic phase for which said unit has been configured.

5. System according to claim 3 wherein said set further comprises a sub-set of N buffer memories each being configurable by a respective one of said sequencing units for storing specific command words for said radio transmit/receive subsystem and each of said N buffer memories being activated for a processing operation to program said transmit/receive subsystem by said command words.

6. System according to claim 3 wherein said set further comprises a sub-set of N buffer memories each being configurable for storing data samples received from said radio transmit/receive subsystem in response to a receive time window and each of said buffer memories being activated for a processing operation to transmit said data samples received from said radio transmit/receive subsystem to a respective one of said sequencing units.

7. System according to claim 3 wherein said set further comprises a sub-set of N buffer memories each being configurable for storing data samples received from a respective one of said sequencing units and each of said buffer memories being activated to transmit said data samples in a transmit time window.

8. System according to claim 3 further comprising control means for reconfiguring one of said sequencing units before a current phase, for which said one sequencing unit has been configured, has terminated if a subsequent phase arises having a priority level higher than a priority level of said current phase.

9. System according to claim 3 wherein the N resources of the sub-set are all invoked in a frame for N respective processing operations to receive data in N monitoring windows.

10. System according to claim 1 wherein said station is a base station of a mobile radio network.

\* \* \* \* \*